United States Patent
Fukukita et al.

(10) Patent No.: US 6,275,447 B1
(45) Date of Patent: Aug. 14, 2001

(54) SOUND GENERATING APPARATUS, A SOUND DETECTION APPARATUS, AN ACOUSTIC SENSOR, AND AN ACOUSTIC LIVING BODY MEASURING APPARATUS

(75) Inventors: Hiroshi Fukukita, Tokyo; Hisashi Hagiwara, Yokohama, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/247,561

(22) Filed: Feb. 10, 1999

(30) Foreign Application Priority Data

Feb. 18, 1998 (JP) .................................................. 10-035866

(51) Int. Cl.$^7$ .................................................. G03B 42/06
(52) U.S. Cl. .............................................................. 367/137
(58) Field of Search .................................. 367/137, 135, 367/140, 7, 11; 600/454

(56) References Cited

U.S. PATENT DOCUMENTS 5,590,649   1/1997   Caro et al. .
5,807,258 * 9/1998   Cimochowski et al. ............. 600/454

* cited by examiner

Primary Examiner—Daniel T. Pihulic
(74) Attorney, Agent, or Firm—Connolly Bove Lodge & Hutz LLP (57) ABSTRACT

A sound generating apparatus or a sound detecting apparatus includes: a flexible substrate; and a plurality of bimorphs arranged on a surface of the flexible substrate in a direction at a predetermined interval, each of the bimorphs having input/output terminals. Each of the bimorphs has a rectangular shape and its longitudinal direction is perpendicular to the direction. The flexible substrate has a slit between successive two of the bimorphs. A width of the slit outside the bimorphs is wide. A buffering material covering surfaces of the flexible substrate with the bimorphs exposed or a cover covering the bimorphs with a space may be provided. The cover and the buffering material may have slit. A sound generating apparatus including a plurality of flexible substrates respectively supporting bimorphs may be provided. The flexible substrate may have a comb shape. An acoustic sensor includes the sound generating apparatus, the sound detection apparatus connected therebetween by a flexible substrate, wherein the flexible substrate may include a cable and a connector. A living body measuring apparatus includes the acoustic sensor, wherein phase shift between the sound signal induced by the bimorph and a reference drive signal is detected and a blood pressure is operated by the phase shift amount.

19 Claims, 8 Drawing Sheets

SOUND GENERATING APPARATUS, A SOUND DETECTION APPARATUS, AN ACOUSTIC SENSOR, AND AN ACOUSTIC LIVING BODY MEASURING APPARATUS

BACKGROUND OF THE INVENTION

1. Field of the Invention

This invention relates to a sound generating apparatus, a sound detection apparatus, an acoustic sensor, and an acoustic living body measuring apparatus.

2. Description of the Prior Art

An acoustic sensor for inducing a sound signal in a living body and receiving the sound signal transmitting through living body is known and an acoustic living body measuring apparatus for inducing a sound signal, receiving the sound signal transmitting through a living body, and analysing the received sound signal, and outputting the analyzed result is known. U.S. Pat. No. 5,590,649 discloses an apparatus and a method for measuring an induced perturbation to determine blood pressure. The apparatus includes an exciter positioned over a blood vessel of the patient, for inducing a transmitted exciter waveform into the patient, and a noninvasive sensor positioned over the blood vessel, the noninvasive sensor configured to sense a hemoparameter and to generate a noninvasive sensor signal representative of the hemoparameter containing a component of a received exciter waveform, wherein the exciter and noninvasive sensor are independently provided and the exciter exists in the air in an inflatable bag.

SUMMARY OF THE INVENTION

The aim of the present invention is to provide a superior sound generating apparatus, a superior sound detection apparatus, a superior acoustic sensor, and a superior acoustic living body measuring apparatus.

According to the present invention there is provided a first sound generating apparatus including: a flexible substrate; and a plurality of bimorph cells arranged on a surface of the flexible substrate in a direction at a predetermined interval, each of the bimorph cells having input/output terminals.

In the first sound generating apparatus, each of the bimorph cells has a substantially rectangular shape and a longitudinal direction of each of bimorph cells is perpendicular to the direction. In this case, the flexible substrate has a slit between successive two of the bimorph cells in the longitudinal direction. In this case, the slit may further extend in both directions of the longitudinal direction, a width the extended slit over the bimorph cells is larger than a width of the slit between the successive two of the bimorph cells.

The first sound generating apparatus may further include a buffering material covering surfaces of the flexible substrate with the bimorph cells exposed.

The first sound generating apparatus may further include a cover including a rim connected to the flexible substrate for covering the bimorph cells with a space. In this case, each of the bimorph cells has a substantially rectangular shape, the direction is perpendicular to a longitudinal direction of each of bimorph cells and the cover includes slits in the cover extending in parallel to the longitudinal direction of each of the bimorph cells.

According to the present invention there is also provided a second sound generating apparatus including: a plurality of flexible substrates, each having a rectangular shape and arranged in a direction perpendicular to a longitudinal direction of each of the flexible substrates; first and second bars along the direction, the first bar connecting one side of tips of the flexible substrates, the second bar connecting the other side of tips of the flexible substrates; a plurality of bimorph cells arranged on the flexible substrates respectively, each of the bimorph cells having input/output terminals. In this case, each of the first and second bars may include a buffering material supporting the flexible substrates with both tips of the flexible substrates covered with the buffering material and the sound generating apparatus may further include a buffering cover extending from buffering material for covering the surface of the flexible substrates opposite to the bimorph cells.

According to the present invention there is also provided a third sound generating apparatus including: a flexible substrate having a comb shape; a plurality of bimorph cells arranged on teeth of the flexible substrates respectively, each of the bimorph cells having input/output terminals; and a flexible bar substrate connecting tips of the teeth each other.

According to the present invention there is also provided a sound detecting apparatus including: a flexible substrate; and a plurality of bimorph cells arranged on a surface of the flexible substrate in a direction, each of the bimorph cells having input/output terminals. In this case, each of the bimorph cells has a substantially rectangular shape and a longitudinal direction of each of bimorph cells being perpendicular to the direction.

According to the present invention there is also provided a first acoustic sensor including: first and second portions arranged in a first direction, each including: a flexible substrate and a plurality of bimorph cells arranged on a surface of the flexible substrate in a second direction perpendicular to the first direction, each of the bimorph cells having input/output terminals, and a connecting substrate extending in the first direction for connecting the first substrate to the second substrate to maintain a distance between the first and second portions. In this case, the connecting substrate may include a flexible cable including a connector and wires for connecting the connecter to each of bimorph cells of the first and second portions.

According to the present invention there is also provided a second acoustic sensor including: a sound generation and sound detection portions arranged in a first direction, the sound generation portion including: a flexible substrate; and a plurality of bimorph cells arranged on a surface of the flexible substrate in a second direction perpendicular to the first direction, each of the bimorph cells having input/output terminals, the sound detection portion including: a flexible piezoelectric plastic substrate including an island portion and a bar portion extending from the island portion in the second direction, a tip of the bar portion opposite to the island portion being connected to the flexible substrate; and electrodes on the island portion for detecting the sound from the sound generation portion via a living body and outputting a sound detection signal, a distance between the sound generation portion and the sound detection portion maintained by the bar portion.

According to the present invention there is also provided a living body measuring apparatus comprising:

an acoustic sensor including: a sound generating portion and a second receiving portion arranged in a first direction, each including: a flexible substrate; and a plurality of bimorph cells arranged on a surface of the flexible substrate in a second direction perpendicular to the first direction, each of the bimorph cells having input/output terminals, and a connecting substrate extending in the first direction for connecting the first substrate to the second substrate to maintain a distance between the sound generating portion and the sound receiving portions; a reference signal generating circuit for generating a reference signal; a driving circuit responsive to the reference signal generating circuit for generating and supplying a driving signal to at least one of the bimorph cells of the sound generating portion to induce a sound signal in a living body, at least one of the bimorph cells of the sound receiving portion receiving the sound signal transmitting through the living body and generating a sound detection signal; and a phase detecting circuit for detecting a phase difference between the reference signal and the sound detection signal and outputting the phase difference data.

In this case, one of the bimorph cells of the sound generating portion is arranged adjacent to the one of bimorph cells of the sound generating portion supplied with the drive signal as a level detecting bimorph cell to detect the sound signal transmitting through the living body and the controlling circuit for detecting a level of the sound signal from the level detecting bimorph cell and controlling the driving circuit to control a level of the sound signal generated by the sound generating bimorph cell.

In this case, a blood pressure operation circuit for operating a blood pressure in accordance with the phase difference data may be further provided.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

<First Embodiment>

Figure 1:
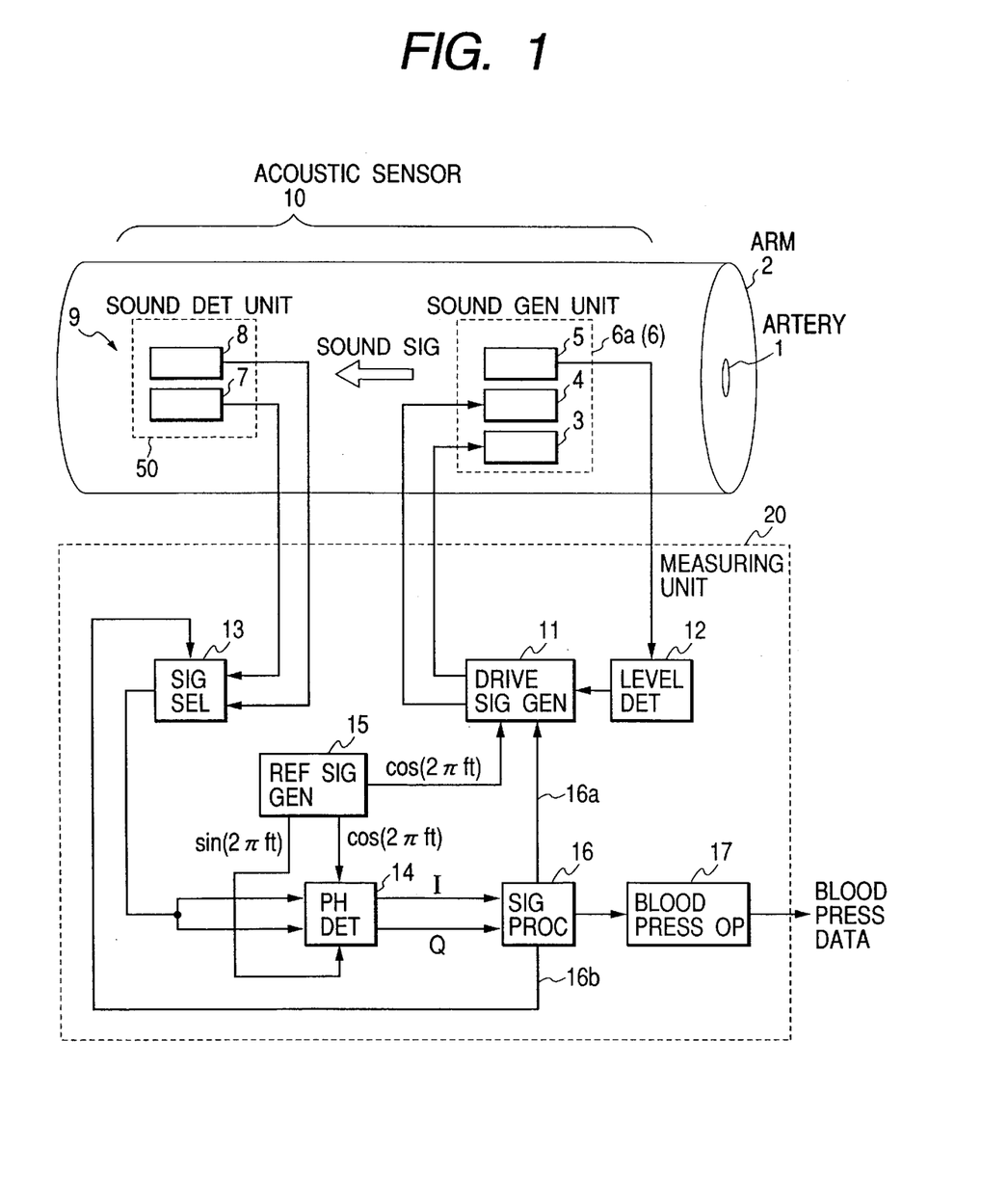
FIG. 1 is a block diagram of a first embodiment showing an acoustic living body measurement apparatus using an acoustic sensor.

FIG. 1 is a block diagram of a first embodiment showing an acoustic living body measurement apparatus using an acoustic sensor.

The acoustic living body measurement apparatus includes an acoustic sensor 10 and a measuring unit 20. The prove 10 includes a sound generation unit 6 for generating a sound signal, that is, inducing a sound signal in a living body, and a sound detection unit 9 for detecting the sound signal induced by the sound generation unit 6 which sound signal is transmitted through a target living body (arm 2).

The sound generation unit includes bimorph cells 3 and 4 for inducing the sound signal in the living body in response to drive signals and a bimorph cell 5 for detecting the sound signal induced by the bimorph cells 3 and 4 transmitted through the target living body supplied to the measuring unit 20 to detect a level of the sound signal.

The sound detection unit 9 includes bimorph cells 7 and 8 on a flexible substrate 50 for detecting the sound signal transmitted through the arm 2 for generating the sound detection signals which are supplied to the measuring unit 20.

The measuring unit 20 includes a drive signal generation circuit 11 for generating the drive signal to generate the sound signal having a frequency f in response to a frequency reference signal, a level detection circuit 12 for detecting a level of the sound signal induced by the bimorph cell 5 and transmitting through the living body, the drive signal generation circuit 11 controlling the level of the drive signal in accordance with the level of the sound signal from the bimorph cell 5 to control the intensity of the sound signal generated, a reference signal generation circuit 15 for generating the reference signals (cos (2π ft) and sin (2π ft)), a signal selection circuit 13 for selecting either of the sound detection signal from the bimorph cell 7 or the bimorph cell 8, a phase detection circuit 14 for detecting the phase of the sound detection signal from the signal selection circuit 13 by multiplying the sound detection signal by the frequency reference signals sin (2π ft) and cos (2π ft), a signal processing circuit 16 for operating a phase angle from outputs of the phase detection circuit 14, and a blood pressure operation circuit 17 for operating a blood pressure from the phase angle from the signal processing circuit 16.

Figure 2A:
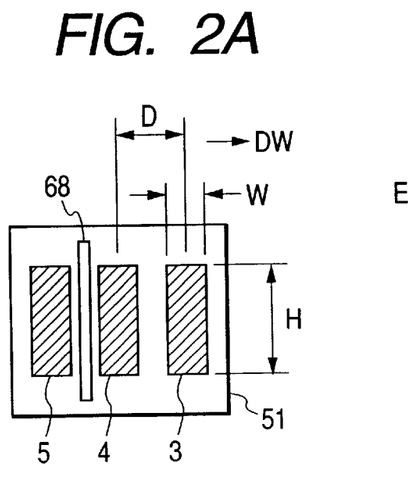
FIG. 2A is a plan view of a sound generation unit of the first embodiment.
Figure 2B:
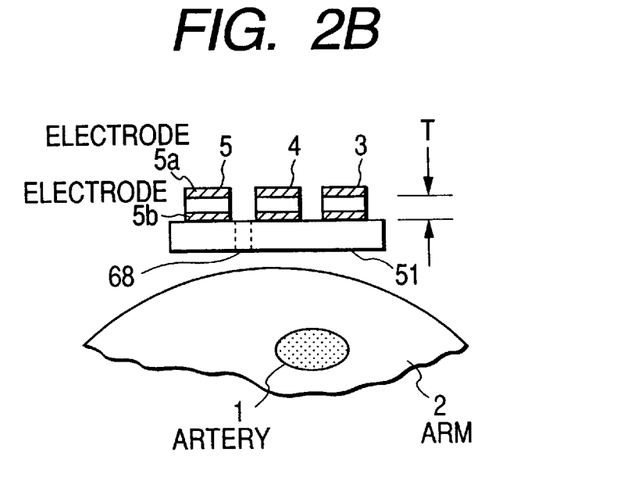
FIG. 2B is a front view of the sound generation unit of the first embodiment.
Figure 2C:
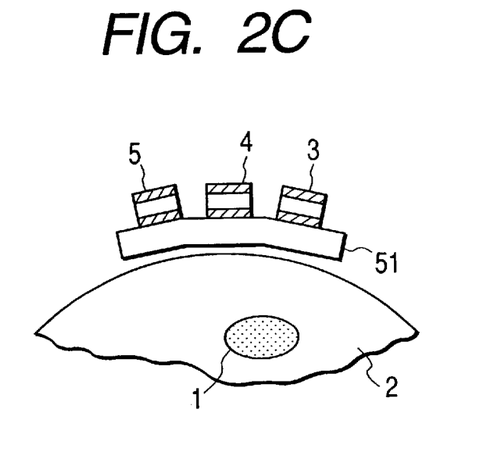
FIG. 2C is a front view of the sound generation unit of the first embodiment in the condition that the sound generation unit is attached and held on the arm.
Figure 2D:
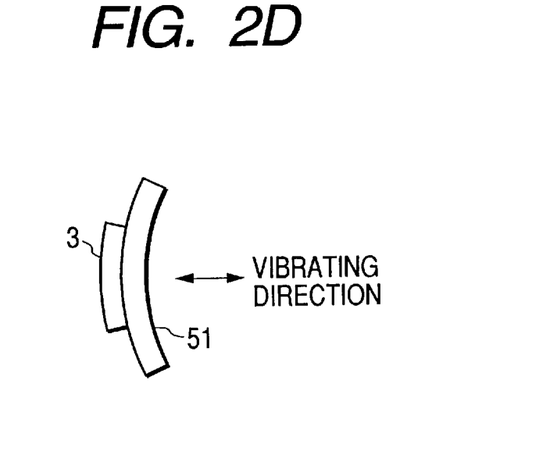
FIG. 2D is a side view of the sound generation unit of the first embodiment showing a vibrating operation.

FIG. 2A is a plan view of a sound generation unit 6 of the first embodiment. FIG. 2B is a front view of the sound generation unit 6 of the first embodiment. FIG. 2C is a front view of the sound generation unit 6 of the first embodiment in the condition that the sound generation unit 6 is attached to and held on the arm 2 by a not-shown belt or by the other arm or the like. FIG. 2D is a side view of the sound generation unit 6 of the first embodiment showing a vibrating operation.

The sound generation unit 6 further includes a substrate 51 which is not a piezoelectric substance and is flexible. The bimorph cells 3 and 4 are fixed to a surface of the substrate 51 with a predetermined interval D therebetween. The bimorph cell 5 is fixed to the surface of the substrate 51 with the interval D between the bimorph cell 5 and the bimorph cell 4 where a slit 68 is provided in the substrate 51. The slit 68 may be filled with the air or an elastic material such as a rubber.

Each of the bimorph cells 3, 4, and 5 has a rectangular parallelepiped having a width W, a height H, and thickness T, wherein H>W and is arranged on the substrate 51 in the direction of the width W. The bimorph cells 3 and 4 are supplied with the drive signals of the frequency f. The drive signal generation circuit 11 supplies the drive signals to a portion or all of bimorph cells 3 and 4 by amplifying the frequency reference signal Cos ($2\pi$ ft).

One of the main vibrations is a contour vibration in the direction H. By this vibration, the bimorph cells 3 and 4 provides a bending movement of the substrate 51 in the vibration directions as shown in FIG. 2D because one surface of each of the bimorph cells 3 and 4 is fixed to the substrate 51, so that the sound signal is generated, that is, the sound signal is induced in the arm 2. Each of the bimorph cells has electrodes (5a and 5b) for receiving the drive signal or supplying the sound detection signal or the level detection signal.

The height H of each of bimorph cells 3 to 8 is about 1 cm and the thickness T of the bimorph cells 3 to 8 and a thickness Tn of the substrate 51 are adjusted to obtain a resonance frequency about 1 kHz. For example, 10T<W and 10Tn<W. The sizes of the bimorph cell 5 for detecting the level of the sound signal has similar dimensions to the bimorph cells 3 and 4 for generating the sound signals.

Because the size of the substrate 51 of the sound generation unit 6 in the width direction W is several cm which is sufficiently smaller than the wavelength of the sound signal, the sound signal transmits from the bimorph cells 3 and 4 to the bimorph cell 5 for level detection by diffraction of the sound signal through the living body. The bimorph cell 5 is provided to detect the level of the sound signal induced in the arm. However, there is a possibility that the sound signal is directly detected by the bimorph cell 5 not through the target living body. Then, the slit 68 is provided between the bimorph cells 4 and 5 to separate the bimorph cell 5 from the bimorph cell 4. A width Ws of the slit 68 is determined such that Ws<W. The sound detection unit 9 is provided as similar to the sound generation unit 6. However, the slit 68 in the substrate 50 may be omitted occasionally.

As mentioned, the level of the sound signal detected by the bimorph cell 5 is accurately obtained by the level detection circuit 12. If the level of the sound signal is low with reference to a reference level, the intensity of the drive signal is increased by the drive signal generation circuit 11.

Because the size of the sound generation unit 6 has the dimension of about several cm in the width direction DW, it is necessary to closely contact the sound generation unit 6 with the surface of the arm 2 above the artery 1.

FIG. 2C shows the condition that the sound generation unit 6 is contact with the arm 2. The substrate 51 is made of a thin metal plate and thus, shows a flexibility itself. However, portions where the bimorph cells 3, 4, and 5 are bonded, so that they show a lower flexibility. On the other hand, because the intermediate portions between the bimorph cells 3, 4, and 5 show a relatively high flexibility, so that the substrate 51 can be bent. Accordingly, the sound generation unit 6 can be contact with the surface of the arm 2 as shown in FIG. 2C.

The sound signal induced in the arm 2 by the bimorph cells 3 and 4 transmits through the arm 2 and reaches the sound detection unit 9. A portion of the sound signal is transmitted through the artery 1. The sound signal detected by the bimorph cell 7 and 8 of the sound detection unit 9 is converted into electric signals. Generally, it is known that the sound speed of a sound signal of a low frequency transmitting through the artery 1 varies in accordance with the blood pressure. Therefore, the sound speed varies in response to pulsation of artery 1. Then, the sound signal transmitting through the artery 1 is phase-shifted. On the other hand, the sound signal transmitting through a portion other than the artery 1 is not phase-shifted.

The sound detection signals from the bimorph cells 7 and 8 are partially or entirely added by the signal selection circuit 13 in accordance with a signal selection control signal 16b and the added sound detection signal is supplied to the phase detection circuit 14. The phase detection circuit 14 multiplies the added sound detention signal with the frequency reference signals sin ($2\pi$ ft) and cos ($2\pi$ ft), where in t represents time. I and Q outputs of the phase detention circuit 14 are supplied to the signal processing circuit 16. The signal processing circuit 16 separately detects components Is and Qs subjected to the phase-shifting, i.e., transmitting through the artery 1 and components Ic and Qc not subjected to the phase-shifting, i.e., transmitting through the portion other than the artery 1. Moreover, the signal processing circuit 16 obtains an absolute value As of Is and Qs, the phase Ps of components Is and Qs, and an absolute value Ac of the components Ic and Qc. The phase Ps is important data corresponding to the blood pressure and thus, should be accurately obtained. Therefore, it is desired that the absolute value As of the sound signal transmitting through the artery 1 is high and the absolute value Ac is low.

Then, the signal processing circuit 16 compares ratios between As and Ac between the case that either of the bimorph cell 3 or 4 (which one of the bimorph cells 3 and 4) is driven and the case that all of the bimorph cells 3 and 4 are driven by controlling the drive signal generation circuit 11 with a drive signal control signal 16a. Moreover, the signal processing circuit 16 compares the ratios between the As and Ac between the case that the signal selection circuit 13 selects the sound detection signal from either of the bimorph cell 7 or 8 (which one of the bimorph cells 7 and 8) is driven and the case that all of the bimorph cells 7 and 8 are selected (added) by controlling the signal selection circuit 13 with the signal selection control signal 16b. That is, the signal processing circuit 16 obtains an optimum driving condition of the bimorph cells 3 and 4 and an optimum detecting condition of bimorph cells 7 and 8 to make As highest and Ac smallest. The phase Ps obtained by the signal processing circuit 16 is supplied to the blood pressure operation circuit 17 which converts the phase Ps into a blood pressure value. More specifically, an instantaneous value of the blood pressure is obtained from the value of the phase Ps in accordance with a relation between the phase Ps and the actual blood pressure which is previously obtained by actual measurement with a maximum and minimum hemadynamometer and is stored in a memory in the blood pressure operation circuit 17. The blood pressure operation circuit 17 outputs the blood pressure data.

<Second Embodiment>

Figure 3:
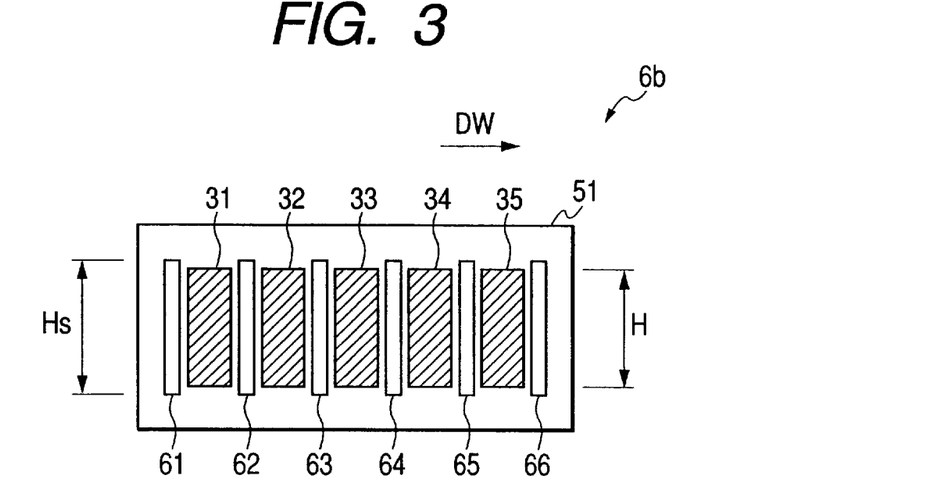
FIG. 3 is a plan view of a sound generation unit of a second embodiment.

FIG. 3 is a plan view of a sound generation unit of a second embodiment. The structure of the second embodiment is substantially the same as that of the first embodiment. The difference is in the structure of the sound generation unit 6b. Bimorph cells 31 to 35 are bonded on a surface of the substrate 51 such that they are arranged in a direction DW. In the substrate 51, a plurality of separating slits are provided in parallel to the longitudinal direction of bimorph cells 31 to 35. The bimorph cells 31 is arranged between separating slits 61 and 62; the bimorph cells 32, between separating slits 62 and 63; the bimorph cells 33, between separating slits 63 and 64; the bimorph cells 34, between separating slits 64 and 65; and the bimorph cells 35, between separating slits 65 and 66. Each of separating slits 61 to 66 has a height H which is larger than the height H of the bimorph cells 31 to 35.

When four bimorph cells out of the bimorph cells 31 to 35 are supplied with the drive signals, the bimorph cells supplied with the drive signals generate bending vibrations and it is possible to use the remaining bimorph cell to detect the level of the sound signal. The sound detection signal from the remaining bimorph cell is supplied to the level detection circuit 12.

Because the slits 61 to 66 are provided to respective bimorph cells 31 to 35, it is possible to use any one of bimorph cells 31 to 35 to monitor the level of the sound signals generated by the other bimorph cells. The slits 61 to 66 provide a further flexibility when the sound generation unit 6b is contact with the arm 2. In other words, the size of the substrate 51 in the direction DW can be made larger.

<Third Embodiment>

Figure 4:
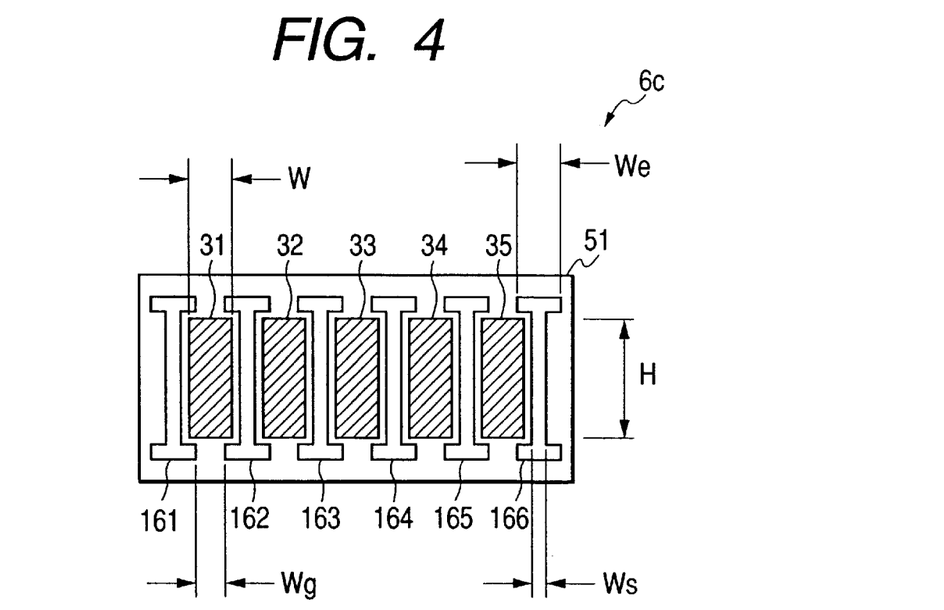
FIG. 4 is a plan view of a sound generation unit of a third embodiment.

FIG. 4 is a plan view of a sound generation unit 6c of a third embodiment. The structure of the third embodiment is substantially the same as that of the second embodiment. The difference is in the structure of the sound generation unit 6c. The slits 161 to 166 have wide portions at both ends of respective slits 161 to 166. That is, each slit has a width Ws within the height H and a width We outside the height H, wherein Ws<We. Therefore, an interval of consecutive two slits Wg outside the height H is smaller than the width W of each of the bimorph cells of 31 to 35.

When four bimorph cells out of the bimorph cells 31 to 35 are supplied with the drive signals, these bimorph cells generate bending vibrations and it is possible to use the remaining one of bimorph cells 31 to 35 to detect the level of the sound signal. The sound detection signal from the remaining bimorph cell is supplied to the level detection circuit 12.

Because the slits 161 to 166 are provided to respective bimorph cells 31 to 35, any one of bimorph cells 31 to 35 is used to monitor the level of the sound signals generated by the other bimorph cells. Moreover, the slits 161 to 166 have wide portions outside the height H, which reduce transmitting the vibrations between neighbor bimorph cells.

Moreover, the slits 161 to 166 provide a further flexibility when the sound generation unit 6c is contact with the arm 2. In other words, the size of the substrate 51 in the direction DW can be made larger.

<Fourth Embodiment>

Figures 5A, 5B:
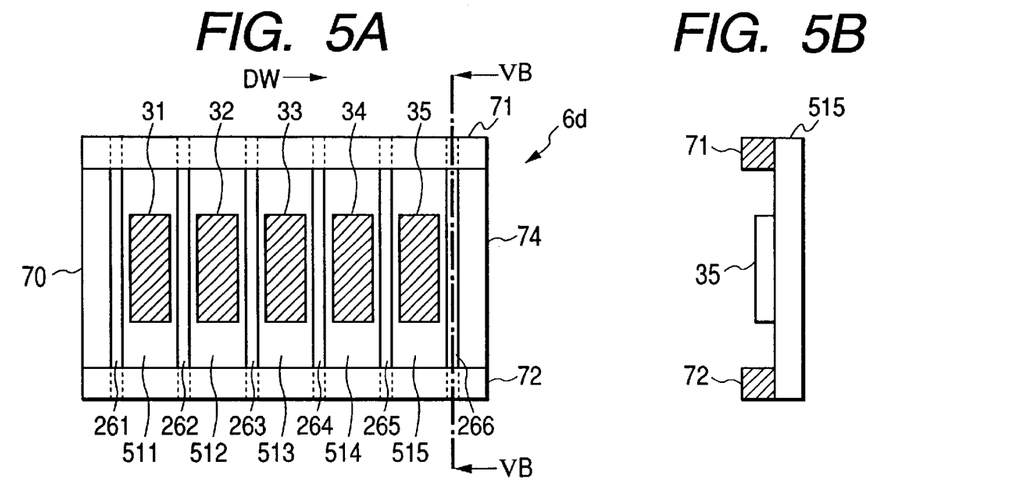
FIG. 5A is a plan view of a sound generation unit of a fourth embodiment.
FIG. 5B is a cross-sectional view of the sound generation unit of the fourth embodiment.

FIG. 5A is a plan view of a sound generation unit 6d of a fourth embodiment. FIG. 5B is a cross-sectional view of the sound generation unit of the fourth embodiment. The structure of the fourth embodiment is substantially the same as that of the second embodiment. The difference is in the structure of the sound generation unit 6d. The bimorph cells 31 to 35 are bonded on rectangular substrates 511 to 515 with slits 261 to 266 arranged in a direction DW. Upper ends and lower ends (in the drawing) of substrates 511 to 515 are connected with flexible connecting bars 71 and 72 made of rubber or the like, respectively, as shown in FIGS. 5A and 5B. Moreover, ends of the connecting bars 71 an 72 are connected by bars 70 and 74 such that the slits 261 to 266 are provided. Because the flexible substrates 511 to 515 are separately formed, so that there is a tendency that vibration does not transmit between the bimorph cells 31 to 35 compared with the case of the united flexible substrate according to the first to third embodiments.

<Fifth Embodiment>

Figures 6A, 6B:
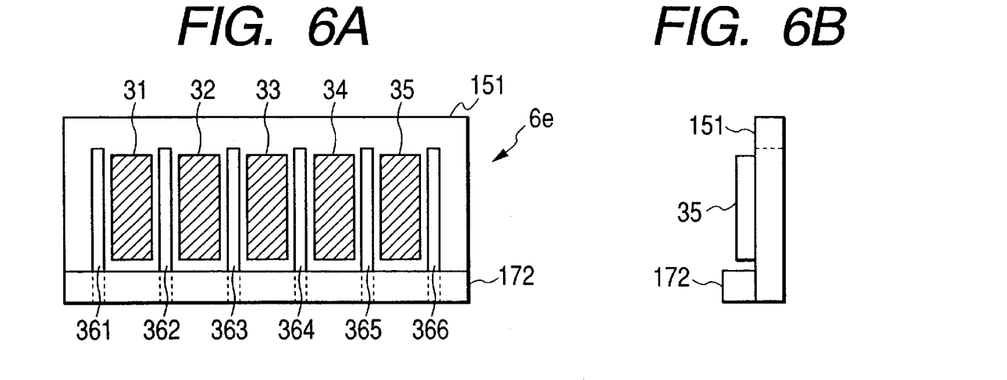
FIG. 6A is a plan view of a sound generation unit of a fifth embodiment.
FIG. 6B is a side view of the sound generation unit of the fifth embodiment.
Figure 6C:
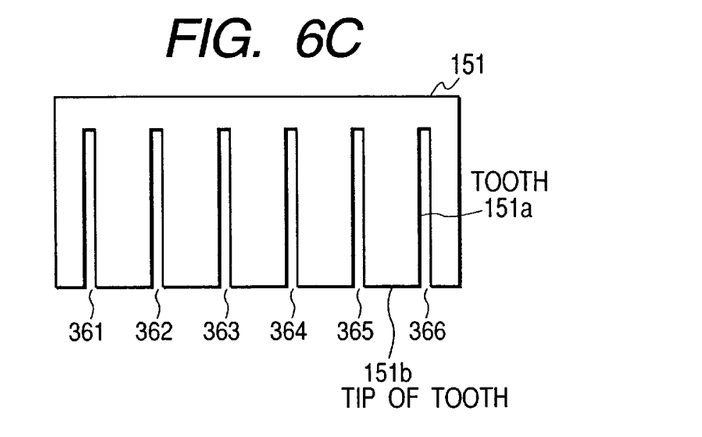
FIG. 6C is a plan view of a substrate in the sound generation unit of the fifth embodiment.

FIG. 6A is a plan view of a sound generation unit of a fifth embodiment. FIG. 6B is a side view of the sound generation unit of the fifth embodiment. FIG. 6C is a plan view of a substrate of the sound generation unit of the fifth embodiment. The structure of the fifth embodiment is substantially the same as that of the second embodiment. The difference is in the structure of the sound generation unit 6e. The bimorph cells 31 to 35 are bonded on respective teeth 151a of a substrate 151 having a comb shape, wherein slits 361 to 366 are provided between teeth. Tips 151b of the teeth 151a of the substrates 151 are connected with a flexible connecting bar 172 which is made of rubber or the like.

Moreover, the sound generation unit 6e may be provided as follows:

One large bimorph plate is bonded on a substrate made of a metal, and then, the substrate and the bimorph cell plate are cut to provide the comb shape of the substrate 151 and the respective bimorph cells 31 to 35 at the same time. Then, the flexible connecting bar 172 is bonded similarly. In this case, bonding processing is made simple.

<Sixth Embodiment>

Figure 7A:
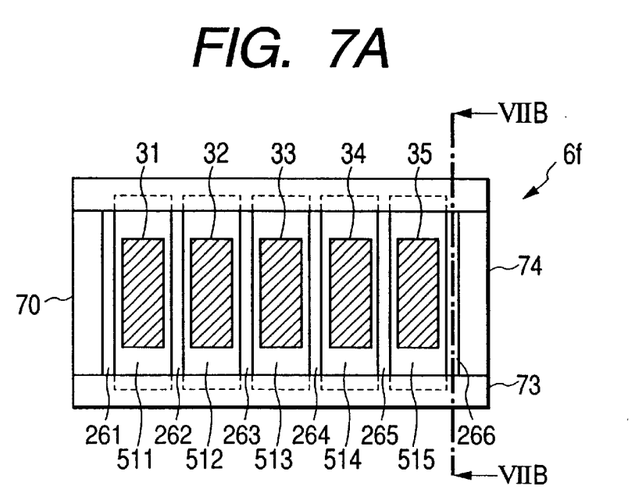
FIG. 7A is a plan view of a sound generation unit of a sixth embodiment.
Figure 7B:
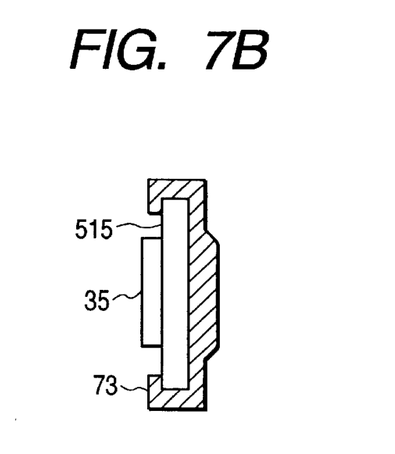
FIG. 7B is a cross-sectional view of the sound generation unit of the sixth embodiment.

FIG. 7A is a plan view of a sound generation unit of a sixth embodiment. FIG. 7B is a cross-sectional view of the sound generation unit of the sixth embodiment. The structure of the sixth embodiment is substantially the same as that of the fourth embodiment. The difference is in the structure of the sound generation unit 6f.

The substrates 511 to 515 are supported with a formed buffering material 73 such as rubber and the surfaces of substrates 511 to 515 opposite to the bimorph cells 261 to 266 are covered with the buffering material, wherein the bimorph cells 261 to 266 are exposed.

The bimorph cells 261 to 266 are substantially isolated with respect to vibration because the buffering material 73 is flexible and elastic. Moreover, it is easy to bend the whole of the sound generation unit 6f because the buffering material 73 is flexible, which provides a better fit on the arm 2. Moreover, the buffering material 73 moderates the stimulation to the arm 2. The buffering material may has slits along the slits 261 to 266 to improve the flexibility.

In this embodiment, the buffering material 73 is commonly used for supporting and connecting the substrates 511 to 515 and for covering the substrates 511 to 515. On the other hand, the sound generation units 6a to 6e of the first to fifth embodiments may be covered with buffering material 73 such that surfaces of the flexible substrate (substrates) are covered with the bimorph cells exposed. In this case, the buffering material is only used for covering the substrates.

Figure 7C:
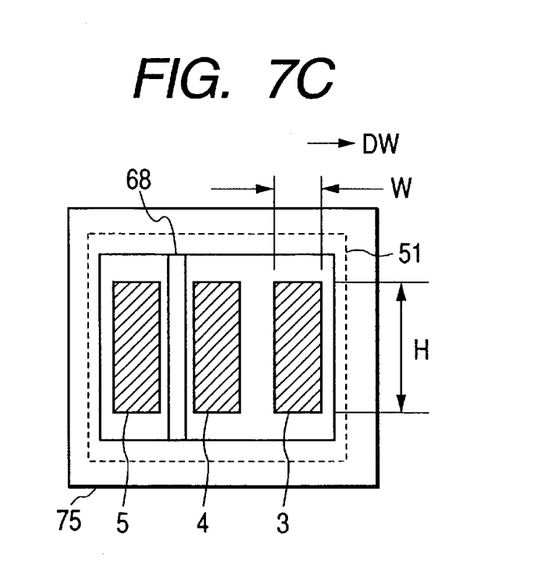
FIG. 7C is a plan view of the sixth embodiment.

FIG. 7C is a plan view of the sixth embodiment, wherein the sound generating unit 6a described at the first embodiment is covered with the buffering material 75 as the sixth embodiment.

<Seventh Embodiment>

Figure 8A:
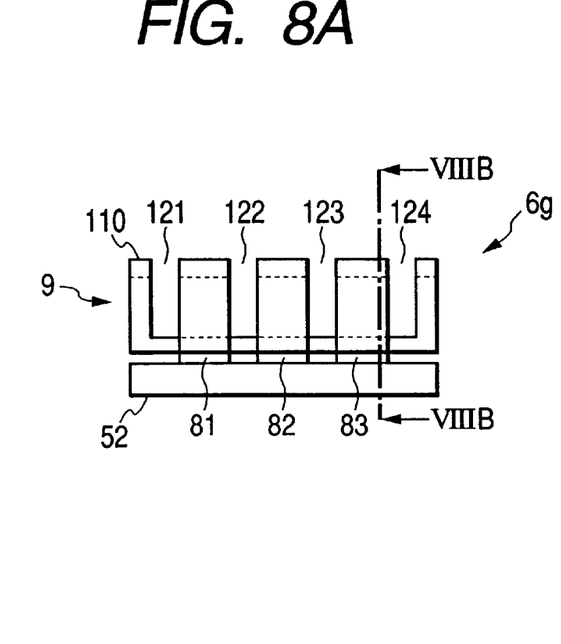
FIG. 8A is a front view of a sound generation unit of a seventh embodiment.
Figure 8B:
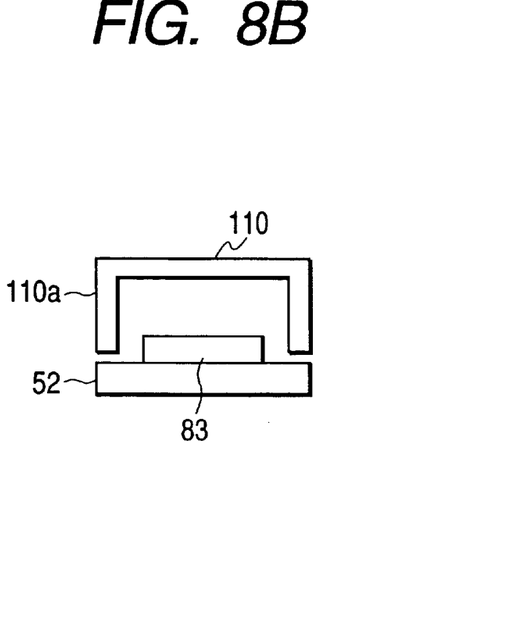
FIG. 8B is a side cross-sectional view of the sound generation unit of the seventh embodiment.

FIG. 8A is a front view of a sound generation unit of a seventh embodiment. FIG. 8B is a side cross-sectional view of the sound generation unit of the seventh embodiment. The structure of the seventh embodiment is substantially the same as that of the first embodiment. The difference is in the structure of the sound generation unit 6g.

The sound generation unit 6g further includes a cover 110, of which rim 110a is supported or connected to a peripheral portion of the substrate 52, for covering the bimorph cells 81 to 83 with a space.

The cover 110 is flexible to fit the substrate 52 to the arm 2.

The cover 110 has slits 121 to 124 in the longitudinal direction of the bimorph cells 83 to increase the flexibility of the cover 110. The cover 110 protects the bimorph cells for detecting the sound signal from obstacle to the vibration of the bimorph cell.

<Eighth Embodiment>

Figure 9A:
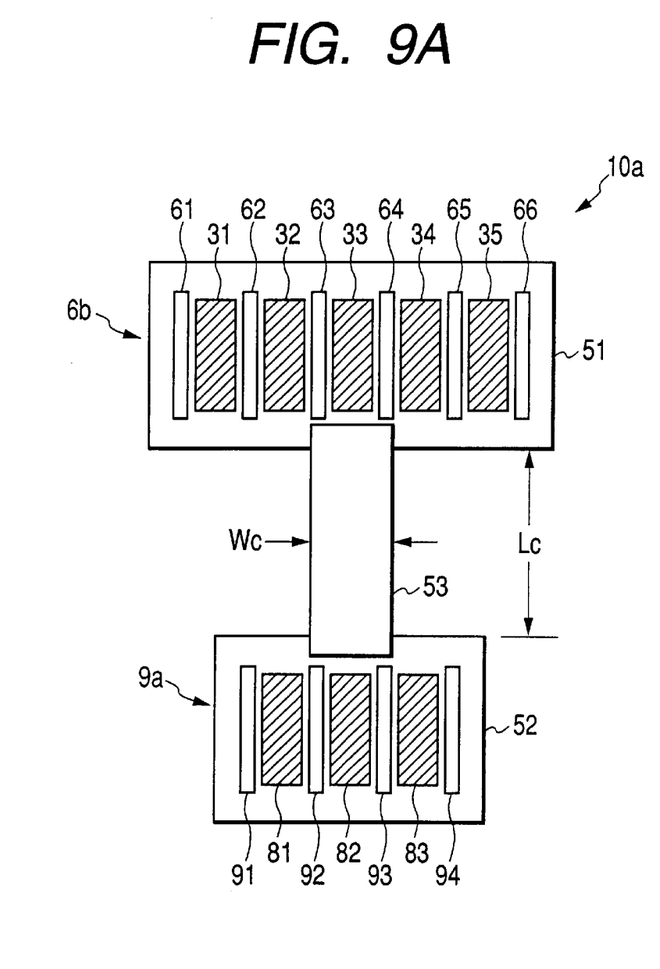
FIG. 9A is a front view of an acoustic sensor of a seventh embodiment.
Figure 9B:
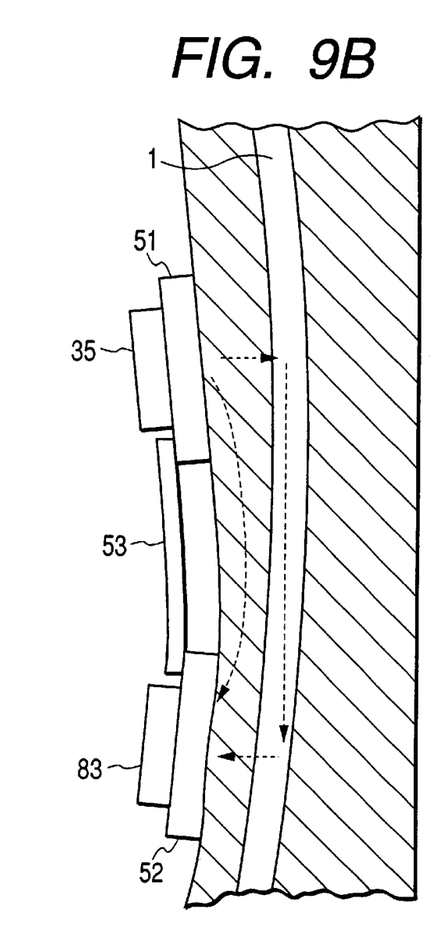
FIG. 9B is a side cross-sectional view of the sound generation unit of the seventh embodiment.

FIG. 9A is a front view of an acoustic sensor of a seventh embodiment. FIG. 9B is a side cross-sectional view of the sound generation unit of the seventh embodiment.

The acoustic sensor 10a includes the sound generation unit 6b, a sound detection unit 9, and a connecting substrate 53 for connecting the sound generation unit 6b to the sound detection unit 9 with a distance Lc therebetween maintained.

The sound detection unit 9a has substantially the same structure as the sound generation unit 6b. The sound generation unit 9a includes a substrate 52, bimorph cells 81 to 83 on the substrate 52, and slits 91 to 94, wherein the bimorph cells 81 to 83 is arranged between two slits of the slits 91 to 94.

The connecting substrate 53 is made of a Polyimide sheet which is unextensible to keep the distance Lc. Moreover, the connection substrate 53 has a width Wc which is less than the distance Lc to provide twistability.

The sound signal induced by the sound generation unit 6b transmits through the arm 2 or the artery 1 and is received by the sound detection unit 9 as shown in FIG. 9B.

<Ninth Embodiment>

Figure 10:
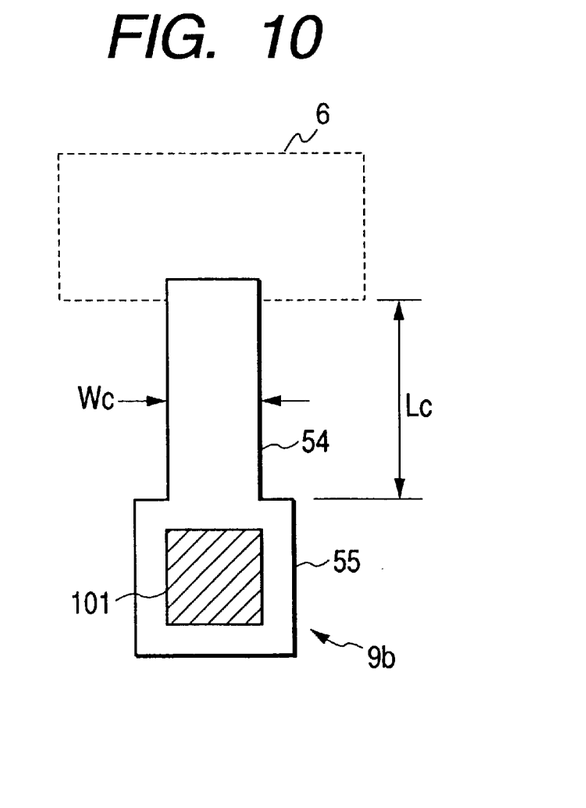
FIG. 10 is a plan view of a sound generation unit of a ninth embodiment.

FIG. 10 is a plan view of an acoustic sensor of a ninth embodiment. The structure of the ninth embodiment is substantially the same as that of the eighth embodiment. The difference is that the sound detection unit 9 and the connecting substrates are united. That is, a piezoelectric material such as PVDF (Polyvinylidene fluoride) is formed to have an island portion 55 and a connecting substrate 54 having a flexibility extending from the island portion 55. On the island portion 55, electrodes are provided to detect the sound signal induced by the sound generation portion 6 via a living body and to output a sound detection signal. A distance Lc between said sound generation portion and the sound detection portion 9b (the island portion 55 and the electrodes 101) maintained by the connecting substrate 54.

The bimorph cell provided by the piezoelectric material (island portion 55) and the electrodes 101 receives the sound signal and generates the sound detection signal.

<Tenth Embodiment>

Figure 11:
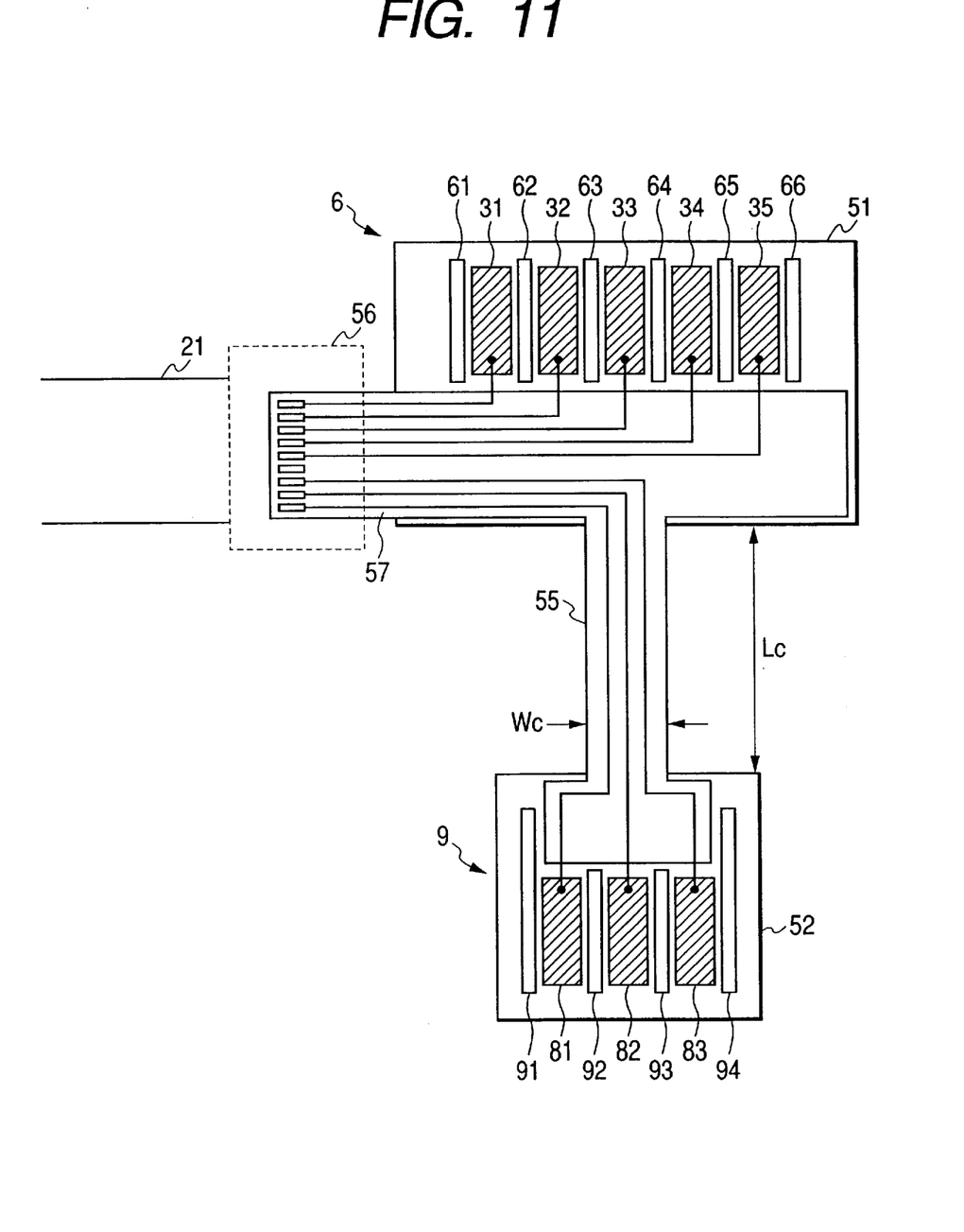
FIG. 11 is a plan view of an acoustic sensor of a tenth embodiment.

FIG. 11 is a plan view of an acoustic sensor of a tenth embodiment. The structure of the tenth embodiment is substantially the same as that of the eighth embodiment. The difference is that the connecting substrate is provided by a flexible cable 55 including a connector 56 and wires 57 for connecting the connecter 56 to each of bimorph cells 31 to 35 and 81 to 83.

The connector 58 is connected to a connector 56 provided to a cable 21 for connecting the connector 59 to the measuring unit 20.

What is claimed is:

1. A sound generating apparatus comprising:
   a flexible substrate; and
   a plurality of bimorph cells arranged on a surface of said flexible substrate at a predetermined interval along a predetermined direction, each of said bimorph cells having input/output terminals, wherein said bimorph cells are fixed to said surface of said flexible substrate and thereby, flexibility of said sound generating apparatus at intermediate portions between said bimorph cells is higher than flexibility of said sound generating apparatus at portions of said bimorph cells to bend said flexible substrate in said direction.

2. The sound generating apparatus as claimed in claim 1, wherein each of said bimorph cells has a substantially rectangular shape and a longitudinal direction of each of bimorph cells is perpendicular to said direction.

3. A sound generating apparatus comprising: a flexible substrate; and a plurality of bimorph cells arranged along a direction on a surface of said flexible substrate at a predetermined interval, each of said bimorph cells having input/output terminals, wherein each of said bimorph cells has a substantially rectangular shape and a longitudinal direction of each of bimorph cells is perpendicular to said direction and said flexible substrate having a slit between successive two of said bimorph cells in said longitudinal direction.

4. The sound generating apparatus as claimed in claim 3, wherein said slit extends in both directions of said longitudinal direction, a width of the extended slit over said bimorph cells is larger than a width of said slit between said successive two of said bimorph cells.

5. A sound generating apparatus comprising: a flexible substrate; a plurality of bimorph cells arranged along a direction on a surface of said flexible substrate at a predetermined interval, each of said bimorph cells having input/output terminals; and
   a buffering material covering surfaces of said flexible substrate with said bimorph cells exposed.

6. A sound generating apparatus comprising: a flexible substrate;
   a plurality of bimorph cells arranged along a direction on a surface of said flexible substrate at a predetermined interval, each of said bimorph cells having input/output terminals; and
   a cover including a rim connected to said flexible substrate for covering said bimorph cells with a space.

7. The sound generating apparatus as claimed in claim 6, wherein each of said bimorph cells has a substantially rectangular shape, a longitudinal direction of each of bimorph cells is perpendicular to said direction and said cover includes slits in said cover extending in said longitudinal direction of each of bimorph cells.

8. A sound generating apparatus comprising:
   a plurality of flexible substrates, each having a rectangular shape, arranged in a direction at a predetermined interval;
   first and second bars along said direction, said first bar connecting one side of tips of said flexible substrates, said second bar connecting the other side of tips of said flexible substrates; and
   a plurality of bimorph cells arranged on said flexible substrates respectively, each of said bimorph cells having input/output terminals.

9. A sound generating apparatus as claimed in claim 8, wherein each of said first and second bars comprises a buffering material supporting said flexible substrates with said one and the other sides of tips of said flexible substrates covered with said buffering material and said sound generating apparatus further comprises a buffering cover extending from buffering material for covering the surface of said flexible substrates opposite to said bimorph cells.

10. A sound generating apparatus comprising:
    a flexible substrate having a comb shape;
    a plurality of bimorph cells arranged on teeth of said flexible substrates respectively, each of said bimorph cells having input/output terminals; and
    a flexible bar substrate connecting tips of said teeth each other.

11. A sound detecting apparatus comprising a flexible substrate; and a plurality of bimorph cells arranged along a direction on a surface of said flexible substrate, each of said bimorph cells having input/output terminals, wherein said bimorph cells are fixed to said surface of said flexible substrate and thereby, flexibility of said sound generating apparatus at intermediate portions between said bimorph cells is higher than flexibility of said sound generating apparatus at portions of said bimorph cells to bend said flexible substrate in said direction.

12. The sound detecting apparatus as claimed in claim 11, wherein each of said bimorph cells has a substantially rectangular shape and said direction is perpendicular to a longitudinal direction of each of bimorph cells.

13. An acoustic sensor comprising:

first and second portions arranged in a first direction, each including:

a flexible substrate; and a plurality of bimorph cells arranged on a surface of said flexible substrate in a second direction perpendicular to said first direction, each of said bimorph cells having input/output terminals; and connecting substrate extending in said first direction for connecting said first substrate to said second substrate to maintain a distance between said first and second portions.

14. The acoustic sensor as claimed in claim 13, wherein said connecting substrate comprises a flexible cable including a connector and wires for connecting said connecter to each of bimorph cells of said first and second portions.

15. An acoustic sensor comprising:

sound generation and sound detection portions arranged in a first direction, said sound generation portion including:

a flexible substrate; and a plurality of bimorph cells arranged on a surface of said flexible substrate in a second direction perpendicular to said first direction, each of said bimorph cells having input/output terminals, said sound detection portion including:

a flexible piezoelectric plastic substrate including an island portion and a bar portion extending from said island portion in said second direction, a tip of said bar portion opposite to said island portion being connected to said flexible substrate; and electrodes on said island portion for detecting the sound from said sound generation portion via a living body and outputting a sound detection signal, a distance between said sound generation portion and said sound detection portion maintained by said bar portion.

16. The sound generating apparatus as claimed in claim 2, wherein said flexible substrate has a slit between successive two of said bimorph cells in said longitudinal direction.

17. A sound generating apparatus as claimed in claim 16 wherein said slit extends in both directions of said longitudinal direction, a width of the extended slit over said bimorph cells is larger than a width of said slit between said successive two of said bimorph cells.

18. The sound generating apparatus as claimed in claim 1, further comprising a buffering material covering surfaces of said flexible substrate with said bimorph cells exposed.

19. The sound generating apparatus as claimed in claim 1, further comprising a cover including a rim connected to said flexible substrate for covering said bimorph cells with a space.

* * * * *